Jan. 30, 1951 A. R. ERBE 2,539,409

AUTOMATIC PHONOGRAPH

Original Filed Feb. 8, 1943 4 Sheets-Sheet 1

INVENTOR
ALFRED ROSCOE ERBE
BY Alvin A. Martin
ATTORNEY

Jan. 30, 1951 A. R. ERBE 2,539,409

AUTOMATIC PHONOGRAPH

Original Filed Feb. 8, 1943 4 Sheets-Sheet 2

INVENTOR
ALFRED ROSCOE ERBE
BY [signature]
ATTORNEY

INVENTOR
ALFRED ROSCOE ERBE
BY [signature]
ATTORNEY

Jan. 30, 1951

A. R. ERBE 2,539,409

AUTOMATIC PHONOGRAPH

Original Filed Feb. 8, 1943

4 Sheets-Sheet 4

INVENTOR
ALFRED ROSCOE ERBE
BY Edwin De Martin
ATTORNEY

Patented Jan. 30, 1951

2,539,409

UNITED STATES PATENT OFFICE 2,539,409

AUTOMATIC PHONOGRAPH

Alfred Roscoe Erbe, Fort Wayne, Ind., assignor, by mesne assignments, to Farnsworth Research Corporation, a corporation of Indiana Continuation of application Serial No. 475,121, February 8, 1943. This application September 20, 1943, Serial No. 503,036

4 Claims. (Cl. 274—10)

This invention relates generally to automatic phonograph apparatus and more particularly to an automatic phonograph mechanism for successively dropping records from a stack to a turntable. This application is a continuation of my application Serial No. 475,121, filed February 8, 1943, now abandoned.

In automatic phonograph apparatus of the type adapted successively to drop records from a stack to a turntable, it is necessary that the stack of records to be played be supported above the turntable in such a manner that space is provided to allow records to accumulate as the individual records are played. Therefore, it is necessary that the lowermost supported record of the stack drop through a considerable distance to the turntable. Various mechanisms have been proposed for successively dropping records, some of which include a special form of spindle on which the stack of records is aligned. In this form of record-changing mechanism, the lowermost supported record of the stack is usually released by a horizontally moving member which slides the record from supporting shelves and allows it to drop as guided by the spindle. In other forms of drop-type record-changing mechanisms, the spindle, itself, is arranged to support the stack of records and release the lowermost supported record to allow it to fall to the turntable.

In the above-mentioned drop-type record-changing mechanism, it has been found that mutilation of records occurs due to the action of the rotating spindle on the centering aperture of the falling record. Difficulty has also been experienced in so arranging record changers of this type that a stack of records may be placed on the spindle in position to be dropped one at a time. It has also been found that a considerable amount of objectionable noise is produced by each record as it drops to the turntable since there is no mechanism provided for controlling the position of the record to maintain it in a horizontal position.

Accordingly, the principal object of this invention is to provide a novel record-changing apparatus of the type adapted to drop one record at a time to the turntable.

Another object of this invention is to provide an automatic record-changing apparatus including an arrangement of supports for guiding each record from a stack to the turntable, thereby to prevent mutilation of records and undue noise during operation.

It is also an object of the present invention to provide an automatic record-changing apparatus of the type adapted to successively drop records from a stack to a turntable having improved and simplified construction.

In accordance with the present invention, there is provided an automatic record-changing apparatus comprising a turntable and diametrically opposite supports for engaging the peripheral edge portions of the records in a stack, thereby to support a stack of records above the turntable. One of the record supports includes a sliding member controlled by the record-changing mechanism for sliding the lowermost supported record from a main shelf to an auxiliary shelf, spaced thereunder and movable with the sliding member. Thus, one edge of the lowermost supported record may be removed from the main supporting shelf to a lower auxiliary shelf. The opposite edge of the lowermost supported record is also engaged by a sliding member also controlled by the record-changing mechanism for disengaging it from the support. For preventing the record from dropping directly and freely to the turntable, there is provided an elevator mechanism which engages the record as it falls to move it into a position parallel to the turntable. The record is then gradually lowered into engagement with the centering spindle of the turntable, at which time the first-mentioned sliding member is returned to its normal position. After the record is engaged with the centering spindle, it is simultaneously released from each support and allowed to drop a remaining short distance to the turntable whereby the record is parallel therewith as it drops. Thus, by guiding the record through a substantial portion of its path to the turntable, there is no mutilation and substantially no noise.

For a better understanding of the invention, together with other and further objects thereof, reference is made to the following description taken in connection with the accompanying drawings, and its scope will be pointed out in the appended claims.

Figure 1:
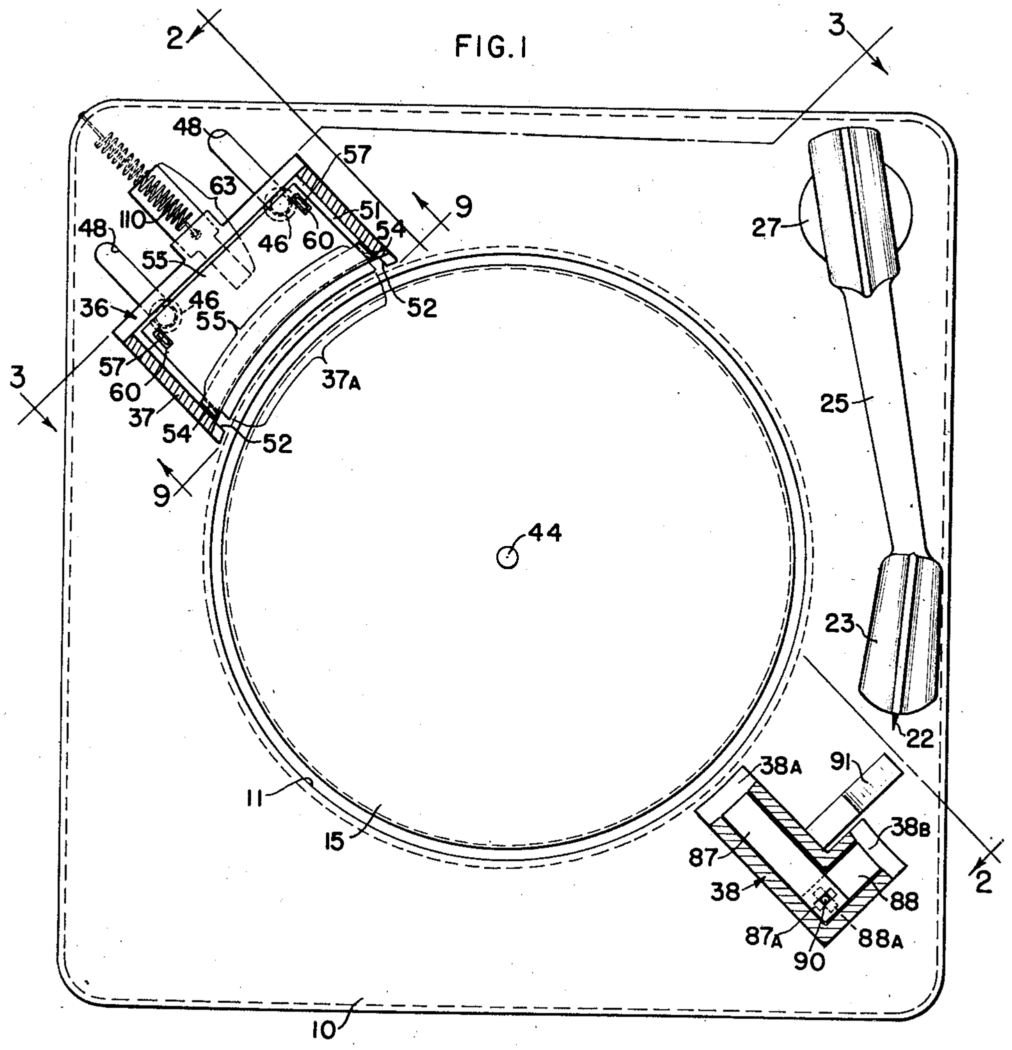
Fig. 1 is a top plan view, partly in section, of the apparatus in accordance with the invention, with the unplayed records removed.
Figure 2:
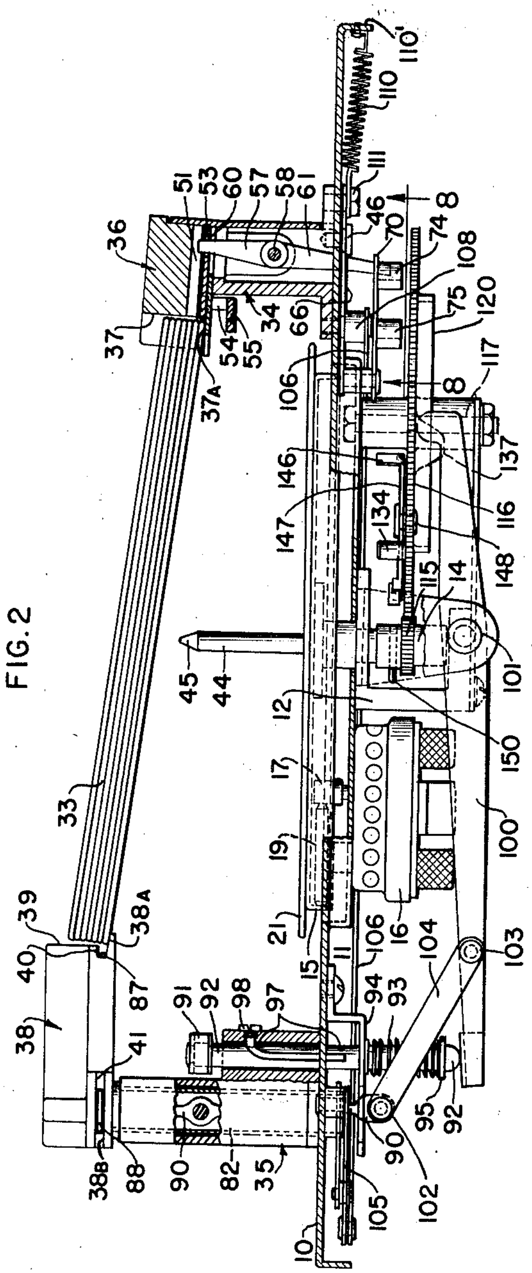
Fig. 2 is a right-side elevation, taken on line 2—2 of Fig. 1 and partly in section, showing a group of records supported over the turntable and a record on the turntable in playing position.
Figure 3:
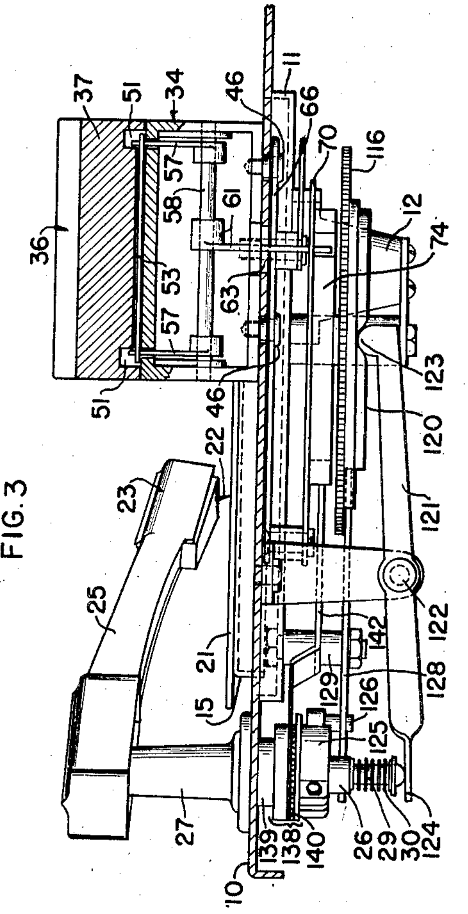
Fig. 3 is a rear elevation of the apparatus, taken on line 3—3 of Fig. 1, showing partly in section, the cam arrangement for raising and lowering the pickup arm, and the construction of the rear record-supporting and releasing mechanism.

Referring now more particularly to Figs. 1–3 of the drawings, the invention here illustrated, embodies a phonograph apparatus including a base plate 10 provided with a well 11 for supporting a bracket 12 (Fig. 2). The base plate 10 and bracket 12 support a rotatable shaft 14 to which is rigidly connected a record-supporting turntable 15 (Fig. 2). The turntable 15 and shaft 14 are driven by means of an electric motor 16. A pulley 17 on the motor 16 engages a friction wheel 18 which in turn engages the inner surface of a flange at the edge of the turntable 15 (Fig. 2).

There is provided for reproducing the record 21, a pickup 23 having a stylus 22 for tracking the playing grooves of the record. The pickup 23 is supported at one end of a pickup arm 25 which is pivoted at its opposite end on a tubular shaft 26 rotatable in a pedestal 27 (Fig. 3). The pedestal is fixed in a suitable manner to the base plate 10 (Fig. 3). A pin 29, within the tubular shaft 26, is adapted to be moved into engagement with the underside of the pickup arm 25 to lift the stylus 22 out of engagement with a record on the turntable 15. A spring member 30 normally biases the pin 29 to the position shown in Fig. 3.

There is provided a means for supporting a stack of records 33 above the turntable 15, comprising a pair of diametrically opposite pedestals 34 and 35 (Figs. 2 and 5–7) together with record-supporting brackets 36 and 38. Record guides 37 and 39 are fixed to the brackets 36 and 38 whereby the stack 33 is maintained in fixed relation to the turntable 15. The bracket 36 is provided with a supporting shelf 37A which is formed to engage a substantial portion of the lowermost supported record of the stack and prevents tilting thereof. The bracket 38 is provided with a pair of record-supporting shelves 38A and 38B, and notched as shown at 40 and 41 (Figs. 2 and 5–7). When the brackets 36 and 38 are in the position shown in Fig. 2, the supporting shelves 37A and 38A engage opposite peripheral edge portions of the lowermost record of, for example, a stack of 10-inch records. The brackets 36 and 38 may be connected to move in unison, in a manner hereinafter to be described so that, when the bracket 38 is rotated 90° in a counter-clockwise direction (Fig. 1), the bracket 36 is moved outwardly from the center of the turntable 15 whereby the supporting shelves 37A and 38B are positioned to engage opposite peripheral edge portions of the lowermost record of a stack of 12-inch records.

As shown in Fig. 2, the turntable 15 is provided with centering spindle 44 which extends above the turntable 15 and terminates in a tapered portion 45 whereby to facilitate transfer of the lowermost supported record to the turntable 15.

Figure 9:
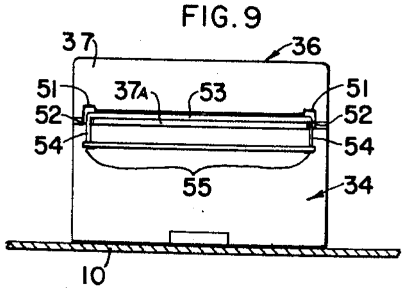
Fig. 9 is a fragmentary view taken on line 9—9 of Fig. 1.
Figure 4:
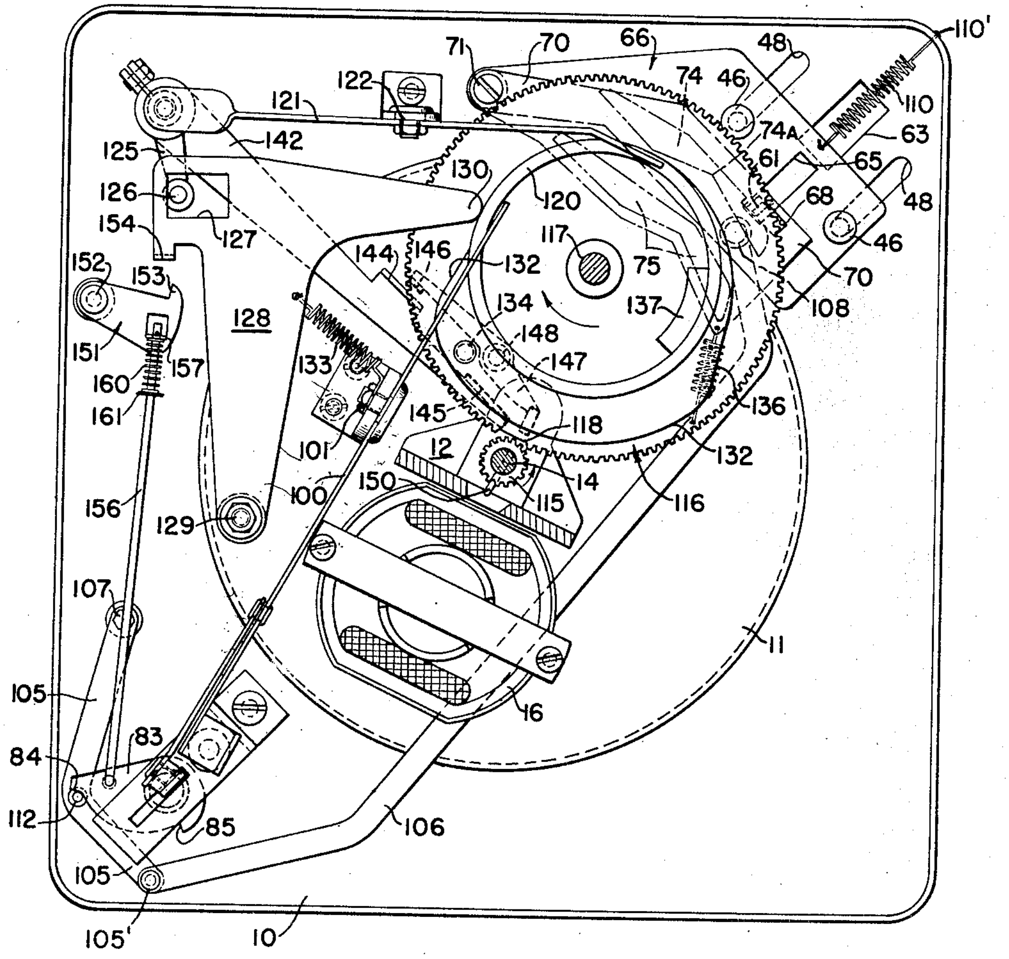
Fig. 4 is a bottom plan view of the apparatus of Fig. 1.

The detailed construction of the rear record support assembly is shown in Figs. 1–3. The pedestal 34 is movably mounted to slide upon the base plate 10 by means of a pair of shoulder studs 46 which extend upward through a pair of slots 48 in the base plate 10 (Figs. 1 and 4) and are affixed to the bottom of the pedestal 34 (Figs. 1–4). These slots 48 guide the members 46 when the pedestal 34 is moved in a manner presently to be described. As shown in Fig. 3, record guide 37 is provided with a pair of slots 51 and the supporting shelf 37A is provided with a pair of slots 52 (Figs. 1 and 9). There is provided a record-moving member 53 (Figs. 2 and 3), having a pair of arms 54 formed thereon, which extend into slots 52 and support a secondary record-supporting shelf 55 (Figs. 1–2 and 9). The member 53 is actuated by a pair of arms 57 which are affixed to a pin 58 pivotally supported by the pedestal 34 (Fig. 3). The upper ends of the arms 57 project into slots 51 and engage slots 60 formed on each side of the slidable member 53 (Figs. 1 and 2) whereby there is positive engagement between arms 57 and member 53 and the movement of member 53 is controlled by slots 51. The arms 57 are actuated by an arm 61 fixedly positioned near the midpoint of the pin 58 (Fig. 3). The arm 61 extends downwardly through a slot 63 provided in the base plate 10 (Figs. 1 and 3), and a slot 65 provided in a plate 66 (Figs. 2 and 4). The plate 66 is supported on the underneath side of the base plate 10 by the pins 46 (Fig. 2) so as to move with the pedestal 34 when the latter is moved from a 10-inch record-supporting position to a 12-inch record-supporting position or vice versa.

The lower end of the arm 61 freely engages a slot 68 provided in a plate 70, as shown in Fig. 4. The plate 70 may be pivotally connected to the plate 66 by means of a pin 71 (Fig. 4). As shown in Figs. 2–4 and 8, a pair of cam-shaped members 74 and 75 are affixed to the underside of the plate 70. Movement of the plate 70 and the cam members 74 and 75 will be described hereinafter.

The construction of the front pedestal 35 is shown in Figs. 1 and 2. The bracket 38 is fixed to the upper end of a tubular shaft 82 (Fig. 2), which is rotatable about a vertical axis within the pedestal 35. Secured to the lower end of the shaft 82 is a cam-shaped plate 83, which is provided with a pair of notched portions 84 and 85 (Fig. 4). The bracket 38 is also provided with a pair of slidable members 87 and 88 which move into the notched portions 40 and 41 and are adapted to disengage records from the supporting shelves 38A and 38B. These slidable members 87 and 88 are actuated by a pin 90 which is movable in the tubular shaft 82 (Fig. 2). The upper end of the pin 90 operatively engages the slots 87A and 88A provided in the slidable members 87 and 88 respectively (Fig. 1).

An elevator mechanism is provided for temporarily supporting the left-hand edge of a record (Fig. 2) after it is released from either of the shelves 38A and 38B. This mechanism is shown in Figs. 1 and 2, and includes an arm 91 fixed to the upper end of a pin 92 which is movable vertically in the base of the pedestal 35 (Fig. 2). The arm 91 and pin 92 are normally biased to the position shown in Fig. 2 by a spring member 93. One end of the spring member 93 abuts against a bracket 94 depending from the underside of the base plate 10 (Fig. 2), while the other end of the spring member abuts against a flange 95 provided on the pin 92. As shown in Fig. 2, the pin 92 is provided with a groove 97, the upper end of which spirals 90° from the vertical portion thereof. The upper end of the groove 97 may be engaged by a guide member such as screw 98, as shown in Fig. 2. When the pin 92 is raised in a manner presently to be described, the spiraled portion of the groove 97 in cooperation with the screw 98, causes the pin 92 and arm 91 to rotate 90° in a counterclockwise direction (Fig. 1) from the position shown in Fig. 1. In this latter position, the arm 91 is elevated and adapted to receive a record from either the shelf 38A or the shelf 38B depending upon the position of the bracket 38.

The mechanism for actuating the pin 90 and for elevating and lowering the pin 92, is disclosed in Figs. 2 and 4. This mechanism includes a lever 100 pivoted near its midpoint on a pivot 101 depending from the bottom of the base plate 10 (Figs. 2 and 4). The left-hand end of the lever 100 is in continual engagement with the spring-biased pin 92 (Fig. 2) while the other end is in continual engagement with cam gear 116. The lever 100 is thereby maintained in an idle position as shown in Fig. 2 and movement of the lever 100 will be described hereinafter. A connecting link 104, which has one end anchored at 102 to the lower end of the pin 90 and the other end anchored at 103 to the lever 100, is provided to actuate the pin 90 in timed relation with the vertical movement of the pin 92, when the latter is moved by the lever 100, in a manner presently to be described.

The brackets 36 and 38 are connected to move in unison by a connecting means preferably in the form of a lever 105 and bar 106 (Fig. 4). One end of the lever 105 is pivotally connected as at 107 to the base plate 10. The opposite end of the lever 105 is pivotally connected at 105′ to the left-hand end of the bar 106 (Fig. 4), the right-hand end of which is connected to a member 108 which is fixedly secured to the bottom of the support 34 (Fig. 2) and may be an integral part of the pedestal 34. A spring member 110, one end of which is anchored at 110′ to the base plate 10, and the other end of which is anchored to the pedestal 34, as for example, by means of a screw 111 (Fig. 2), normally biases the pedestal 34 and bracket 36 to an outermost position from the center of the turntable 15. However, the pedestal 34 is maintained in the position shown in Fig. 1, by means of a pin 112 affixed to the lever 105 (Fig. 4) which is adapted to move over the peripheral edge of the cam plate 83 and engage the notched portions 84 and 85 provided on the cam plate 83.

When the supporting bracket 38 is in the position shown in Fig. 1, the notch 84 of the cam plate 83 (Fig. 4) is in engagement with the pin 112, and the bracket 36 is maintained in the position shown in Figs. 1 and 2 whereby the shelves 37A and 38A cooperate to support a stack of 10-inch records, as previously described. When the bracket 38 is manually rotated 90° in a counterclockwise direction (Fig. 1), the cam plate 83 is moved in a clockwise direction when viewed as shown in Fig. 4. Cam plate 83 then permits the spring member 110 to act whereby the pedestal 34 moves outwardly from the center of the turntable, thereby moving the lever 105 and rod 106 toward the turntable. When the cam plate 83 has been moved to such a position that the pin 112 engages the notched portion 85 on the cam plate 83 (Fig. 4) the bracket 36 is moved to its outermost position whereby the shelves 37A and 38B of the brackets 36 and 38 are positioned to support a stack of 12-inch records as previously described. Thus, it is seen that the lever mechanism controls the movement of the record supports to two different positions, one for supporting 10-inch records, and the other for supporting 12-inch records.

For carrying out a record-changing cycle, there is provided a pinion gear 115 on turntable shaft 14 together with a mutilated cam gear 116 driven thereby. The cam gear 116 is shown in its complete form in Fig. 4 and has several teeth removed at 118, the purpose of this mutilation being to break the driving connection with the pinion gear 115. One complete revolution of the cam gear 116 defines one complete record-changing cycle, as will be evident hereinafter.

The cam gear 116 is provided with a pickup arm controlling cam surface 120, as shown in Figs. 3 and 4. A lever 121 pivoted intermediate its ends at 121′ on a bracket 122, which is fixed to the base plate 10, has a cam-shaped end 123 engaging the cam surface 120. The other end 124 of the lever 121 engages the pickup arm elevating pin 29 so that lever 121 is normally positioned by spring 30 as shown in Fig. 3. As the cam-shaped end 123 follows the cam surface 120, the opposite end of the lever 121 moves up and down to impart vertical movement to pin 29 and pickup arm 25.

As shown in Figs. 3 and 4, a lever 125 is clamped to the lower end of the tubular shaft 26, to the upper end of which is suitably attached the pickup arm 25. Horizontal movement of the lever 125 effects a corresponding movement of the pickup arm 25 and vice versa. To the other end of the lever 125 is fixed a pin 126 which moves within an elongated aperture 127 provided in the heel of an L-shaped lever 128 (Fig. 4), which is pivoted at 129.

The aperture 127 is large enough so that the pin 126 may move freely over a wide arc corresponding to the movement of the pickup arm 25 during the reproduction of a record. A toe 130 on the L-shaped lever 128 engages a cam surface 132 provided on the cam gear 116 and is maintained in contact with the cam surface 132 by a spring 133, one end of which is connected to lever 128 and the other end of which is connected to bracket 101 on base plate 10. After the stylus 22 has been raised from the surface of the record on the turntable 15, in a manner previously described, and as the cam gear 116 continues to rotate, the cam surface 132 moves the L-shaped lever 128 in a counterclockwise direction (Fig. 4) about its pivot 129 thereby causing the right-hand side of the aperture 127 to engage and drive before it the pin 126. The pin 126 and the lever 125 move the pickup arm 25 in a radial direction away from the center of the record. The cam surface 132 is so shaped that the L-shaped lever 128 ceases its counterclockwise rotation when the pickup arm reaches a predetermined position beyond the edge of the record on the turntable.

Figure 8:
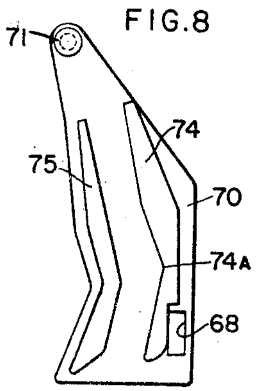
Fig. 8 is a fragmentary view taken on line 8—8 of Fig. 2.

For moving the record-moving member 53 on the record-supporting bracket 36 (Fig. 2) there is provided on the cam wheel 116, a pin 134 affixed thereto for engaging with the cam member 74 (Figs. 4 and 8). As the cam wheel 116 continues to rotate, the pin 134 moves the plate 70 in a counterclockwise direction (Fig. 4) against the biasing action of a spring member 136 one end of which is connected to the plate 70 and the other end of which is connected to the rod 106. Thus, spring 136 returns plate 70 to its normal position after pin 134 has moved it. Plate 70 is associated with arm 61 as explained hereinbefore.

The automatic record-changing cycle effected by a complete revolution of the cam gear 116 is initiated by the automatic tripping mechanism, previously mentioned, which will now be described in greater detail. In moving toward the center of the record during the playing thereof, the pickup arm 25 moves with it the hollow shaft 26 which has secured to it a clutch 138 (Fig. 3). This clutch comprises a flanged sleeve 139 affixed to the tubular shaft 26, and a friction washer 140 upon the upper surface of the clamp portion of arm 125. The annular end of a lever 142 is interposed between the friction washer 140 and the flanged sleeve 139 for rotation about the shaft 26 (Figs. 3 and 4). Thus, as the pickup arm moves toward the center of the record, the friction contact between lever 142, sleeve 139, washer 140 and arm 125, moves the lever 142 in a counterclockwise direction (Fig. 4). A pair of turned-down ears 144 and 145 are provided on the lever 142, as shown in Fig. 4, the ear 144 being adapted to engage a turned-up ear 146 on a starting lever 147, which is pivotally mounted intermediate its ends, by means of a pin 148, to the upper surface of the cam gear 116 (Figs. 2 and 4).

As the pickup arm 25 approaches the inner groove of a record, it moves the lever 142 in a counterclockwise direction (Fig. 4). With each counterclockwise revolution of the pinion gear 115, the pin 150, which is fixedly attached to the hub of pinion gear 115, reverses the counterclockwise movement of the lever 142 by striking the turned-up ear 145 on the lever 142 thereby returning the lever 142 to its starting position. When the stylus 22 moves into the eccentric or spiral lead-in groove customarily provided as the innermost groove of a record, the lever 142 is caused to be moved rapidly in a counterclockwise direction, and before the pinion gear 115 can complete a full revolution, the ear 144 of the lever 142 engages the turned-up end 146 of the lever 147 (Figs. 2 and 4) and moves it in a clockwise direction (Fig. 4). When this occurs, the lower end of the lever 147 moves into the path of a pin 150, attached to and rotating with the shaft 14 (Fig. 4). The pin 150 in rotating, engages the lower end of the member 147 (Fig. 4) and moves it and therewith the cam gear 116 sufficiently far so that its teeth mesh with the teeth of the pinion gear 115, after which the pinion gear 115 continues to drive the cam gear 116 through a complete revolution to effect the cycle of automatic record-changing previously described. When the cam gear 116 completes a cycle, the pin 134 engages the ear 145 on the lever 142 (Fig. 4) and moves the lever 142 in a clockwise direction (Fig. 4) out of a position where the ear 144 would engage the ear 146 of the lever 147 thereby to prevent a second revolution of gear 116.

When the supporting brackets 36 and 38 (Fig. 1) are moved from a position for supporting 10-inch records to a position for supporting 12-inch records, in the manner heretofore described, the cam member 75, provided on the plate 70 (Figs. 4 and 8) is moved into position to be engaged by the pin 134 on the cam gear 116 (Figs. 2 and 4). With the cam member 75 in this latter position, when the cam gear 116 rotates, the pin 134 engages the cam member 75 to thereby actuate the arms 57 and 61 thereby moving the slidable member 53 for cooperating in releasing the lowermost record of a stack of 12-inch records in the same manner as described for 10-inch records.

When changing record sizes, it is also necessary to alter the distance the pickup arm is swung inwardly to its initial playing position. Referring to Figs. 3 and 4, this adjustment is accomplished automatically by means of member 151 pivoted as at 152 on the bottom of the base plate 10 (Fig. 4). The member 151 is provided with an extension 153 which is adapted to be moved into the path of a turned-down ear 154 provided on the L-shaped lever 128 (Fig. 4). The member 151 is connected to the cam plate 83 by means of a rod 156, which has one end anchored to the plate 83 and the other end fixed to a turned-up ear 157 on the member 151. When the supporting bracket 38 is moved from the 10-inch to the 12-inch record-supporting position, the cam plate 83 is moved in a clockwise direction (Fig. 4). This movement of the plate 83 causes the rod 156 to move the member 151 in a counterclockwise direction (Fig. 4) to move the extension 153 into position to be engaged by the ear 154. When the member 151 is moved, the extension 153 engages the face of the ear 154. However, the rod 156 continues to move upwardly (Fig. 4) thereby building up tension in a spring member 160, one end of which abuts against the ear 157 and the other end of which engages a small pin 161 on the rod 156 (Fig. 4). When the L-shaped lever 128 is moved in a counterclockwise direction, during a record-changing cycle, the spring member 160 moves the extension 153 into the path of the turned-down ear 154. With the extension 153 in this latter position, it prevents the L-shaped lever 128 from moving as far in a clockwise direction (Fig. 4) as it otherwise would, whereby the pickup arm 25 is swung inwardly through a shorter arc than is the case when the apparatus is arranged for playing a stack of 10-inch records. When the supporting bracket 38 is moved from the 12-inch to the 10-inch record-supporting position, the member 151 is moved back to the position shown in Fig. 4, and the lever 128 is permitted to swing the pickup arm 25 inwardly over the initial groove of a 10-inch record. Thus, it is evident that the manual positioning of the brackets 36 and 38 for supporting a stack of either 10-inch or 12-inch records, automatically sets the mechanism for positioning the pickup arm so that the stylus 22 engages the initial groove of the record about to be played.

*Mode of operation*

The general mode of operation of the record-changing apparatus will now be described. For purposes of illustration, it will be assumed that the record-supporting brackets are set to support a stack of 10-inch records. It will also be assumed that a record has been placed in playing position on the turntable 15 and a stack of records has been placed upon the brackets 36 and 38 (Fig. 2). The pickup arm 25 may be moved manually to place the stylus 22 in the starting groove of the record on the turntable.

The pickup arm 25 moves inwardly as the stylus 22 tracks the spiral groove of the record and eventually reaches the innermost groove, at which time the automatic tripping mechanism is operated by the movement of the levers 142 and 147 (Fig. 4) in response to the movement of the pickup arm 25, whereby the lever 142 moves the lever 147 into the path of the pin 150 provided on the spindle shaft 14 (Fig. 4).

Engagement of the pin 150 with the lower end of the lever 147 (Fig. 4) causes the cam gear 116 to be rotated until its teeth mesh with the teeth of the pinion gear 115, after which the cam gear 116 is driven by the pinion gear 115 through one revolution to control a record-changing cycle.

As the cam gear 116 rotates, the cam surface 120 (Figs. 3 and 4) moves the lever 121 in a clockwise direction (Fig. 3) and raises the pin 29 to lift the pickup arm off the record and maintain it in an elevated position. Continued movement of the cam gear 116 causes the cam surface 132 (Fig. 4) to move the L-shaped lever 128 in a counterclockwise direction and therewith the arm 125 in a counterclockwise direction (Fig. 4) to swing the pickup arm 25 beyond the edge of the record on the turntable.

Figures 5, 6, 7:
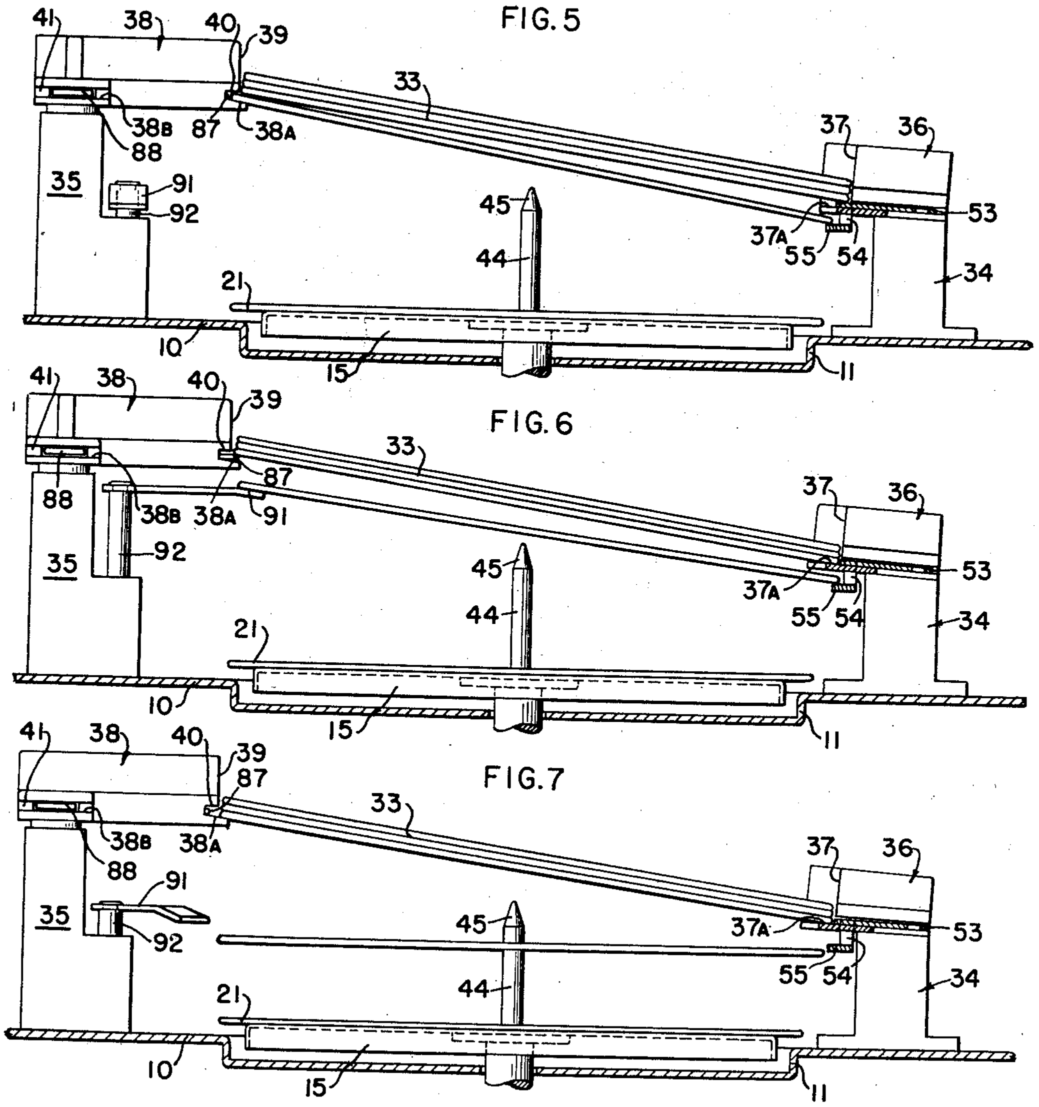
Figs. 5–7 show elevations viewing Fig. 1 from the direction indicated by arrows 2, 2, partly in section, showing successive steps in the separation and releasing of the lowermost record.

Shortly thereafter, the pin 134 (Figs. 2 and 4) on the cam gear 116, engages the cam member 74 to move the plate 70 in a counterclockwise direction (Fig. 4) causing the latter to actuate the arms 57 and 61 (Figs. 2 and 3) to move the slidable member 53 inwardly in relation to the turntable 15. This movement of the slidable member 53 moves the lowermost record (Fig. 2) laterally far enough so that the right-hand edge drops off the record-supporting shelf 37A onto the secondary supporting shelf 55. This phase of the operation is shown in Fig. 5.

As the cam gear 116 continues to rotate, the pin 134 engages the portion 74A of the cam member 74 (Fig. 4), thereby permitting the spring 136 to move the plate 70 inwardly and thereby the member 53 outwardly. As the member 53 moves outwardly, a cam member 137 provided on the cam gear 116 (Figs. 2 and 4), engages the right-hand end of the lever 100 (Figs. 2 and 4), and causes the lever 100 to move in a clockwise direction about its pivot on the bracket 101, which in turn causes its left-hand end to move the pin 92 upwardly (Fig. 2). As the lever 100 moves the pin 92 upwardly, the pin 98 following the groove 97, causes the pin 92 and arm 91 to rotate 90° in a counterclockwise direction from the position shown in Fig. 1. When the right-hand end of the lever 100 moves over the low point of the cam member 137 (Fig. 2), the arm 91 is elevated to a position immediately below the record-supporting shelf 38A. While the lever 100 is elevating the pin 92, the link 104 moves the lower end of the pin 90 outwardly (Fig. 2) which in turn moves the upper end of the pin 90 and the slidable member 87 inwardly with respect to the center of the turntable 15. Immediately after the arm 91 is elevated to its upwardmost position, the slidable member 87 moves the lowermost record to the right until its left-hand edge drops off the record-supporting shelf 38A and falls to a position where it is supported by the supporting arm 91. The record now rests upon arm 91 and the secondary supporting shelf 55, and the second lowermost record is now resting upon the slidable member 87 and the supporting shelf 37A. This phase of the operation is shown in Fig. 6.

As the cam gear 116 continues to rotate, the pin 134 passes out of engagement with the cam member 74, and the cam member 137 gradually moves out of engagement with the lever 100 (Figs 2 and 4). When this occurs, the supporting shelf 55 is restored by the spring member 136 to the position shown in Fig. 2, and the pin 92 is restored by the spring 93 to the position shown in Fig. 2. The pin 92, in moving downwardly, moves the centering aperture of the lowermost supported record into engagement with the centering pin 44. Immediately thereafter, the upper portion of the groove 97 engages the pin 98, whereupon the arm 91 is rotated out of engagement with the lowermost record, and the record drops by gravity towards the turntable 15. This phase of the operation is shown in Fig. 7.

After the lowermost supported record has been moved to the turntable 15, the cam surface 132 has moved to a point where the L-shaped lever 128 begins to move in a clockwise direction (Fig. 4) under the action of the spring 133. When this occurs, the left-hand edge of the aperture 127 engages the pin 126 and moves the pin 126, the lever 125 and the pickup arm 25 to a position where the stylus 22 is over the initial groove of the new record.

By this time the cam surface 120 rotates to the position shown in Fig. 3 where the contour of the cam surface 120 permits the left-hand end of the lever 121 (Fig. 3) to be moved vertically downward by the spring-biased pin 29 and thereby returning the needle 22 into playing engagement with the new record on the turntable 15. Immediately thereafter, the cam gear 116 comes to rest in the position shown in Fig. 4 of the drawings, and reproduction of the record just placed on the turntable 15 takes place.

The next and following cycles of automatic operation are initiated by the automatic trip mechanism each time the stylus 22 moves into the trip groove of the record. The last record of the stack will be repeated until the mechanism is manually shut off.

The played records may be removed from the turntable by lifting the stack above the centering pin 44 and thereafter tilting the stack to clear the supporting brackets 36 and 38.

While there has been described what is at present considered the preferred embodiment of the invention, it will be obvious to those skilled in the art, that various changes and modifications may be made therein without departing from the invention, and it is, therefore, aimed in the appended claims to cover all such changes and modifications as fall within the true spirit and scope of the invention.

What is claimed is:

1. An automatic record-changing apparatus comprising a turntable; first and second oppositely disposed supports relative to said turntable for supporting a stack of records above said turntable by engaging peripheral edge portions of the lowermost supported record; a spindle extending upwardly from said turntable, said spindle being adapted to engage the centering aperture of said lowermost record when said record is released from said supports; first slidable means for moving the lowermost record off of said first support; secondary means operatively associated with said first slidable means for supporting that portion of the lowermost record moved off of said first support; second slidable means for moving said lowermost record off of said second support; movable means adjacent said second support and movable in a first direction to engage that portion of said lowermost record supported by said second support and movable in a second direction for lowering said lowermost record into engagement with said spindle; and driving means operatively associated with said first and second slidable means and said movable means.

2. An automatic record-changing apparatus comprising a turntable; first and second oppositely disposed supports relative to said turntable for supporting a stack of records above said turntable by engaging peripheral edge portions of the lowermost supported record; a spindle extending upwardly from said turntable, said spindle being adapted to engage the centering aperture of said lowermost record when said record is released from said supports; a record-moving member on said first support, comprising a record-engaging portion and an auxiliary record support, said auxiliary record support being adapted to engage one edge of said lowermost record when it is moved off of said first support; another record moving member mounted on said second support, said record-moving members on said first and second supports being movable toward and away from said spindle; a movable record-supporting means adjacent with said second support and adapted to be moved in a first direction into position to support the edge of said lowermost record when it is moved off of said second support and in a second direction to lower said record toward said turntable into engagement with said spindle; and cam means operatively associated with said record moving members and said movable record supporting means for moving said record-moving member on said first support in a first direction for moving said lowermost record off of said first support onto said auxiliary record support, for moving said movable record-supporting means in said first direction, and said record moving member on said second support in a first direction for moving said lowermost record off of said second support onto said movable record-supporting means, and for moving said movable record-supporting means in said second direction and then for simultaneously moving said auxiliary record support and said movable supporting means out of engagement with said lowermost record for releasing said lowermost record.

3. An automatic record-changing apparatus comprising a turntable; first and second oppositely disposed supports relative to said turntable for supporting a stack of records above said turntable by engaging peripheral edge portions of the lowermost supported record; a spindle extending upwardly from said turntable a predetermined height for centering the lowermost records when released from said supports; movable means for releasing said lowermost record from said first support comprising a first movable means including a secondary supporting means connected thereto for supporting that portion of said lowermost record released from said first support; movable means for releasing said lowermost record from said second support; record-lowering means associated with said record-supporting means adapted when moved in a first direction for supporting that portion of said lowermost record released from said second support and when moved in a second direction for lowering said lowermost record into engagement with said spindle and thereafter releasing said lowermost record, said record-lowering means including a vertically movable member and a record-supporting arm and means associated with said vertically movable member for moving said record-supporting arm into record-supporting position when said member is moved in said first direction and for moving said arm out of record-supporting position when said member is moved in said second direction; means operatively associated with said movable means on said first and second supports for moving the lowermost record from said supports onto said secondary supporting means and said record-lowering means; and means operatively associated with said record-lowering means for moving said record-lowering means.

4. An automatic record changing apparatus comprising a turntable, a spindle extending upwardly from said turntable, a pair of record supports disposed diametrically opposite to one another with respect to said turntable, one of said supports being at a certain level with respect to said turntable and including a guide member, the other of said supports being disposed at a higher level with respect to said turntable whereby records tend to rest against said guide member, control means for controlling a record changing cycle, record releasing means operatively associated with said supports and said control means for releasing the lowermost record of the stack, first from the higher record support and then from the lower record support, and elevating means adjacent said higher support and operatively associated with said control means for intercepting the lowermost record and lowering it into engagement with said spindle before said lowermost record is released from the said lower record support.

ALFRED ROSCOE ERBE.

REFERENCES CITED

The following references are of record in the file of this patent:

UNITED STATES PATENTS

| Number | Name | Date |
|---|---|---|
| 1,390,404 | Wahlberg | Sept. 13, 1921 |
| 2,097,288 | Mitchell | Oct. 26, 1937 |
| 2,220,435 | Wright | Nov. 5, 1940 |
| 2,290,518 | Wright | July 21, 1942 |
| 2,297,014 | Offen | Sept. 29, 1942 |
| 2,300,668 | Habegger | Nov. 3, 1942 |
| 2,327,753 | Wilcox | Aug. 24, 1943 |

FOREIGN PATENTS

| Number | Country | Date |
|---|---|---|
| 352,980 | Great Britain | July 13, 1931 |
| 382,276 | Great Britain | Oct. 17, 1932 |